June 24, 1969  S. M. JORGENSEN  3,451,585
SHEAR STUD VESSEL CLOSURES AND SHELL JOINTS
Filed Feb. 15, 1968

*INVENTOR.*
SVEND M. JORGENSEN
BY
*Richard S. Shreve*
ATTORNEY

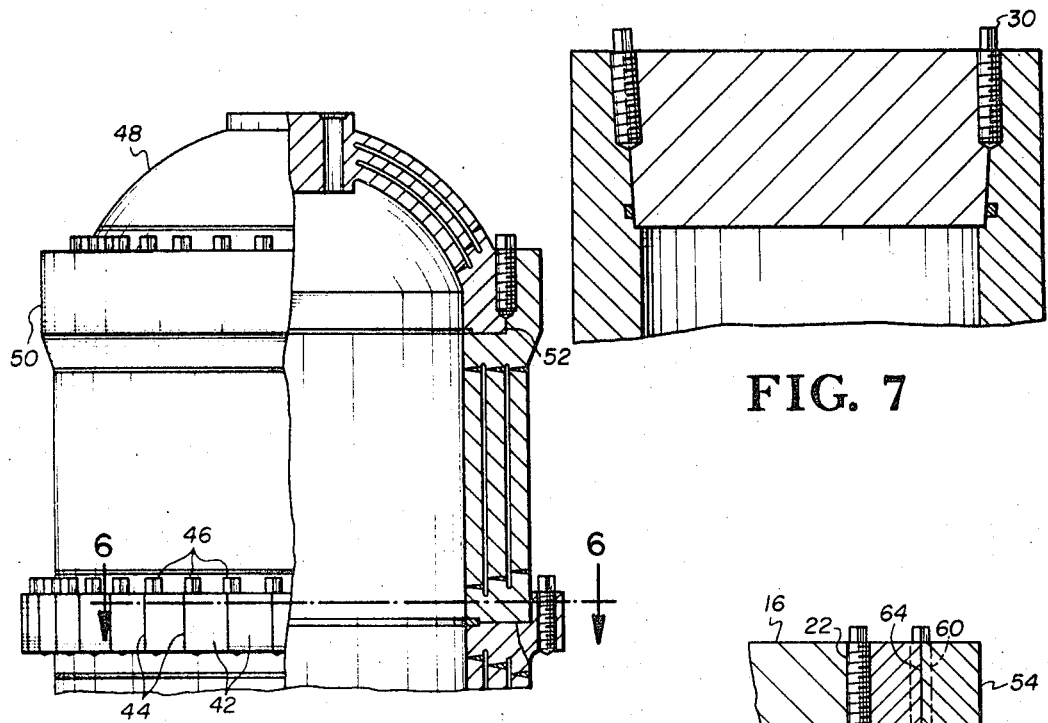
FIG. 5
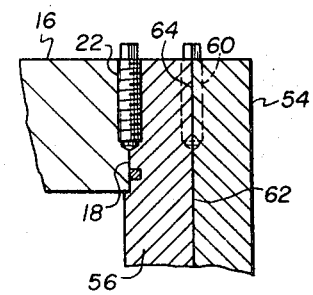
FIG. 7
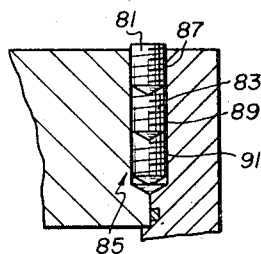
FIG. 8
FIG. 9
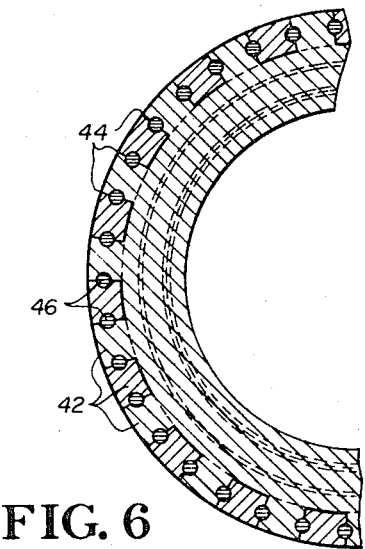
FIG. 6
INVENTOR.
SVEND M. JORGENSEN
ATTORNEY

INVENTOR.
SVEND M. JORGENSEN

ATTORNEY

United States Patent Office

3,451,585
Patented June 24, 1969

3,451,585
SHEAR STUD VESSEL CLOSURES AND SHELL JOINTS
Svend M. Jorgensen, Tenafly, N.J., assignor to Foster Wheeler Corporation, Livingston, N.J., a corporation of New York
Continuation-in-part of application Ser. No. 542,328, Apr. 13, 1966. This application Feb. 15, 1968, Ser. No. 707,383
Int. Cl. B65d 53/00
U.S. Cl. 220—46      3 Claims

ABSTRACT OF THE DISCLOSURE

Stud bolt pressure vessel closure having a circumferential groove in an annular interface between the shell and closure, and one or more rings in said groove with the top ring engaged by said stud bolts, such as a backup ring, a seal ring, and a jack ring, with a seal ring therebelow.

Cross reference

This application is in part a continuation of my copending application Ser. No. 542,328 filed Apr. 13, 1966 now Patent No. 3,398,853.

Prior art

Chi-Sheng Kuo, No. 2,903,152, Sept. 8, 1959.

In this patent there is no sealing means to be engaged by the bottom of the stud bolts, and no cavity to receive the same.

Background

Within industries employing process vessels like converters and reactors, larger units generally result in more economical production. For high pressure processes the vessel sizes are limited by the fabricator's facilities for lifting, handling and machining heavy units. With the appearance of new high tensile steels and new vessel types the vessel sizes, diameter and length, have been increasing slowly but steadily.

With the increase in size new problems have been encountered, among them the vessel closures. The great majority of process vessels require openings, often the full size of the vessel diameter. Practically the only closure employed is the conventional bolted flange unit, with stud bolts attached to a flange at the end of the vessel cylinder. For the larger sizes and higher pressures the bolted flange closure has reached its limit. The cost is disproportionately large compared with total vessel cost; its handling requires special equipment; and its size has become unmanageable. It is impractical and uneconomical beyond certain limits of either size or pressure or both.

Other designs suggested as replacement for the bolted flange joint also are unsatisfactory. For example, the breech block closure, is a threaded plug closure which screws into mating grooves in the pressure vessel opening. The principal drawback is that this closure requires machinery for making the large threads for the huge vessels required today which does not exist in most fabricators' shops, and which would require great capital expenditures. In addition, with breech block closures tolerance problems exist since the large mating threads on the plug and grooves in the pressure vessel have to be made by two different machines which may produce mating irregularities. Similarly, the shear block closure is not satisfactory, requiring large forgings and being bulky for large pressure vessels. Located at the end of the vessel, it is also a great disadvantage that the shear blocks and the opening mechanisms practically cover the whole outside surface of the closure since for process vessels this surface is used for opening such as product inlets and outlets, and instrument connections.

Objects

It is an object of the present invention to provide a high pressure vessel closure that does not require special machinery or bulky and expensive joints.

It is another object of the present invention to provide an improved and inexpensive closure for large or high pressure vessels.

It is another object of the present invention to provide an improved and economical pressure vessel closure for multilayer vessels.

It is still another object of the present invention to provide means for joining cylindrical sections, permitting field erection of vessels too large to be shipped and erected in one piece.

Summary

According to the present invention, a circumferential groove is formed in the interface between the shell and closure. In this groove one or more rings are inserted in position for the top rings to be engaged by the bottoms of the stud bolts. At least one ring constitutes a seal ring which serves as a high pressure gasket to prevent leakage between the closure and shell.

Preferably a backup ring is provided above the sealing ring to distribute thereto the pressure from the stud bolts.

Preferably the shell side of the annular groove is inclined downwardly and inwardly into conical form, and the sealing ring has a complementary outer conical face, to be compressed by the pressure of the stud bolts. Also preferably the seal ring has an annular notch or groove in the bottom thereof, to facilitate the squeezing thereof by the stud bolts.

To facilitate the construction and assembly of the joint, the outer lower rim of the closure is cut away to form a groove to receive a seat ring secured thereon and having a conical face cooperating with the shell groove to squeeze the notched sealing ring.

Drawing

FIGURE 5 is a fragmentary side view, partially in section, of still another variation of the embodiment of the invention;

FIGURE 6 is a fragmentary plan sectional view taken along line 6—6 of FIGURE 5;

FIGURE 7 is a fragmentary side sectional view of a further variation of the embodiment of the invention;

FIGURE 8 is a fragmentary side sectional view of still another variation of the embodiment of the invention;

FIGURE 9 is a fragmentary side sectional view of an additional variation of the embodiment of the invention; and, FIGURES 10 to 12 are a sectional view showing detail variations of the invention.

Detailed description

Figure 1:
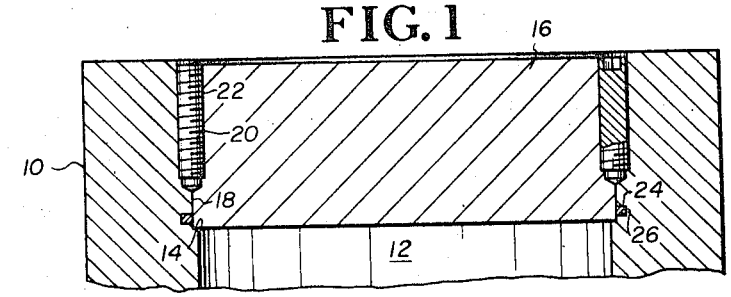
FIGURE 1 is a fragmentary side sectional view of an embodiment of the invention.

Referring now to FIGURE 1, a pressure vessel 10 is shown having a cylindrical chamber 12 therein which is the interior of the vessel. Access to the chamber is obtained through an end opening. The end opening is also cylindrical but has a slightly larger diameter than the chamber so as to form a shoulder 14. Of course, the location of the shoulder determines the position of the inside surface of the closure plug within the vessel. To close the end opening of the vessel, the closure plug 16 or head in the shape of a flat solid disc machined to the dimensions of the end opening is inserted into the end opening. The inside edge of the closure plug rests on the shoulder 14.

Figure 2:
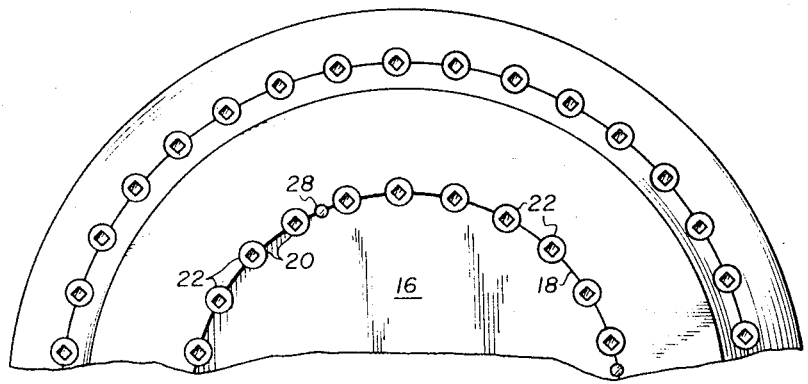
FIGURE 2 is a fragmentary plan view of the embodiment of the invention.

The closure plug has an outside diameter only slightly smaller than the inside diameter of the end opening so that a close fit is formed at the interface 18 between the vessel and the closure plug. A plurality of stud holes 20 are drilled in the closure plug and vessel generally longitudinal to and along the interface. Each stud hole is partially in the head and partly in the vessel wall and the stud holes are spaced around the interface as shown in FIGURE 2. Threads are formed in the holes and studs 22 with mating threads are inserted into the holes to hold the closure plug in position against any internal pressure within the chamber. An O-ring seal 24 located in a groove 26 formed in the end opening adjacent the plug closure prevents leakage of the fluid through the interface 18.

Clearance between the closure plug and vessel wall is necessary to get the closure plug into the opening depending on the tolerances of the opening and closure plug. The amount of clearance between the closure plug and vessel was found not to cause any serious difficulties in the drilling and tapping of the holes.

For drilling, the head can be positioned by various methods. One method, is the initial drilling of three dowel pin holes in the interface about the circumference thereof in which are inserted dowel pins 28 to fix the closure plug with respect to the vessel for drilling the stud holes. Another possible method (not shown) combines both longitudinal and circumferential positioning by welding three bars to the top of the closure plug, the bars extended to rest on machined areas on the vessel end (determining the longitudinal positioning of the head), the extended bars and vessel wall being bored for dowel pins (determining the circumferential positioning of the head).

Although a close machining tolerance between the closure plug and the end opening is not necessary, a close tolerance is important in the machining of the dowel or guide pins and the dowel pin holes since the matching of the threads and grooves of the studs and stud holes depends on the initial assembly of the closure plug and vessel and the fixing of the position of the two parts before the assembly is drilled and tapped.

It is also of importance that the closure plug, after removal, can be put back in the exact same position, so that the threads in the head and vessel of each interface hole are matched. The limits of deviation must be within the limits of thread tolerances.

To align the portion of the stud holes in the closure plug with the corresponding portion of the stud holes in the vessel after replacement of the head, either the dowel pin holes or the stud holes are initially set at unequal angles about the circumference of the closure plug so that only one readily determined position of the closure plug with respect to the vessel will align the stud holes in both the closure plug and vessel.

The shear forces on the stud bolts hold the closure plug in the vessel against the internal pressure. Since each shear stud is held half by the vessel wall 12 and half by the head 16, the determining stress in the studs is the stress in the longitudinal area along the centerline of the stud. The number of threads may conveniently correspond to standard thread series and the length of the studs may be kept between four and five times the diameter of the respective stud bolt. This will keep the tapping operation within standard shop practice and also keep the torque required to insert the studs within reasonable limits. The circumference of the closure plug provides sufficient length for the disposition of enough stud bolts to hold the closure plug in place for very high pressure.

It has been previously pointed out that the clearance between the closure plug and the vessel is not critical. However, the clearance can be minimized by use of a conical closure plug as shown in FIGURE 7. With a conical interface, the stud bolts are angularly inclined either parallel to the longitudinal axis of the vessel or to the interface as illustrated by bolts 30 shown in FIGURE 7 on each side of the closure, respectively. The vertical bolt may be easier to machine, since the shear area in the design criterion, but it should be noted that either approach is equally satisfactory.

Figure 3:
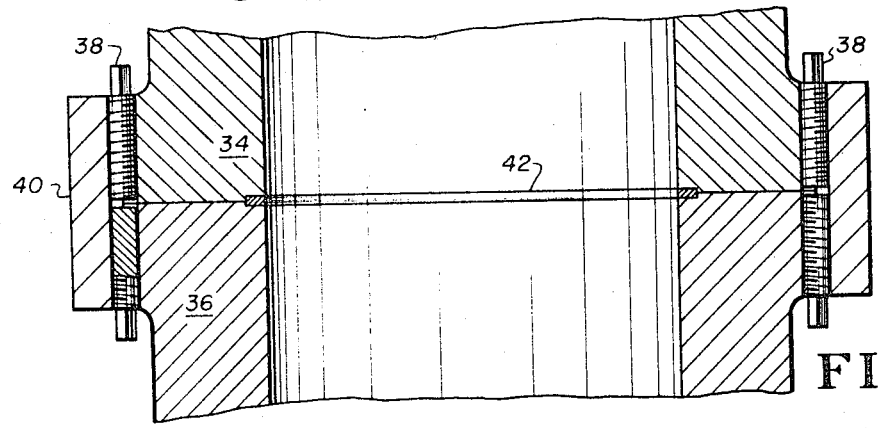
FIGURE 3 is a fragmentary side sectional view of another portion of the embodiment of the invention.

The use of the stud bolts at an interface to create a shear joint is not limited to the securing of a closure plug to the end opening of the vessel. Referring now to FIGURE 3 for a shear stud application for axially joining two sections of the pressure vessel, the cylinder vessel is formed with small flange upset ends 34 and 36 to provide spacing for the insertion of shear studs 38. A cylindrical ring 40 is slipped over the outside diameters of the flanges, and the interface between the ring and the flanges 34 and 36 is drilled and tapped to receive the shear studs 38. The thickness of the ring 40 is made sufficient to take the longitudinal stresses in the vessel wall. An O-ring seal 42 is provided between the vessel sections to prevent leakage.

With this application of the shear stud joint for connecting the vessel sections, shipping and handling limitations are extended permitting larger vessels to be fabricated and shipped in sections and then joined at the vessel site with the usual simple assembling tools.

Although FIGURE 2 illustrates the end closure of FIGURE 1 and the section joint of FIGURE 3 on one vessel it is apparent that either closure may be used alone as well as together on the same vessel.

As an alternate to using the ring 40, for connecting two cylinder sections, FIGURES 5 and 6 show the cylindrical vessel sections crenelated at the ends to be joined. When the two vessel sections are pushed together the alternating crenelations or battlement projections 42 on each pressure vessel section match and fit together so as to form a number of narrow interfaces 44 which are drilled and tapped to receive shear studs 46. The length of the projections 42 need be only half the length of the outside ring 40 of FIGURE 3 since the projections are part of either the upper or lower sections. In this way, the full shear load is not placed on each separate series of shear bolts as shown in FIGURE 3.

FIGURE 5 also shows a dome end closure 48. The pressure vessel is formed into an enlarged end shoulder portion 50 mating with the end of dome 48 forming a longitudinal interface 52 which is drilled and tapped to receive the shear studs as in FIGURE 1.

Figure 4:
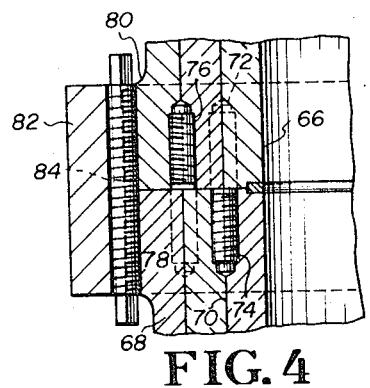
FIGURE 4 is a fragmentary side sectional view of a variation of the embodiment of the invention.

The shear stud joints are useful not only in solid wall vessels, but also in compound shells of two or more layers. The reason for pressure vessels of more than one layer is that high tensile steels of 100,000 p.s.i. ultimate tensile strength are available in thicknesses up to 6 inches. Many pressure vessels today range beyond 6 inches. FIGURES 8 and 4 show the invention for multilayer vessel closures, FIGURE 8 being an end closure for a duplex vessel and FIGURE 4, a joint between two vessel sections. In FIGURE 8, a two layer vessel is illustrated having an outer layer 54 and an inner layer 56 defining a layer interface 62 therebetween. A closure head 16 (as in FIGURE 1) is held in place against the inner layer 56 by shear studs 22 in holes drilled and tapped about the interface 18 between the head and the inner layer. Between the inner and outer layer, layer interface holes 60 are drilled and tapped at the layer interface 62 to receive shear studs 64 which prevent the outer layer from sliding relative to the inner layer and transfer some of the longitudinal load from the inner shell 56 to the outer shell 54. This is desirable in cases where the inner shell is insufficient to carry the whole load due to its thinness, or being of a lower strength material than the outer shell. Studs 22 for the closure plug and closure interface 18, and studs 64 for the inner and outer shell interface are offset (stud 60 being in dashed lines while stud 22 is in full line) to provide greater strength. Vessels having more than two layers may also be used in conjunction with a shear stud and closure. In FIGURE 4, a section joint of a three layer vessel is shown having an inner shell 66, outer shell 68 and intermediate shell 70. Upper inner shell studs 72 and lower inner shell studs 74 are disposed between the inner and intermediate shells. Likewise upper outer shell studs 76 and lower outer shell studs 78 are located between the outer and intermediate shells to hold the layers in place and transmit some of the pressure load to the intermediate shell and outer shell. The outer shell 68 is formed with a small flanged end 80, about which a ring 82 (as in FIGURE 3) is placed, the ring and flanged end defining a ring interface through which holes are drilled and tapped to receive shear studs 84 which clamp and hold the vessel sections together. Here, as in FIGURE 8, the layer interface stud bolts 72 and 74 are angularly separated for greater strength. Also angularly separated are upper and lower outer shear studs 76 and 78.

In certain pressure vessels, particularly those used in the chemical industry, an O-ring is not suitable. Such situations require a metallic seal ring which affords both strength and resistance to corrosion. The shear stud is especially adaptable to seal rings as it serves the dual function of not only providing shear strength as described but as a means to compress a seal ring into place.

Figure 10:
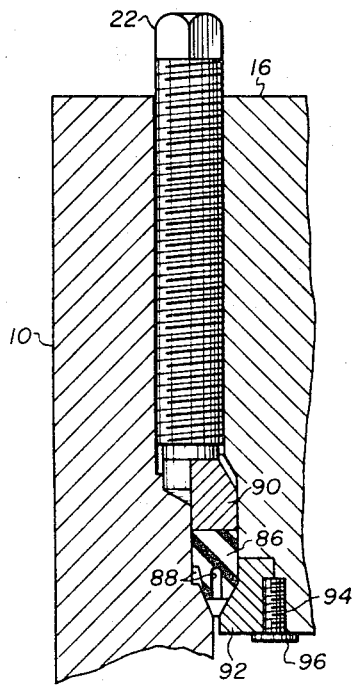
Figure 11:
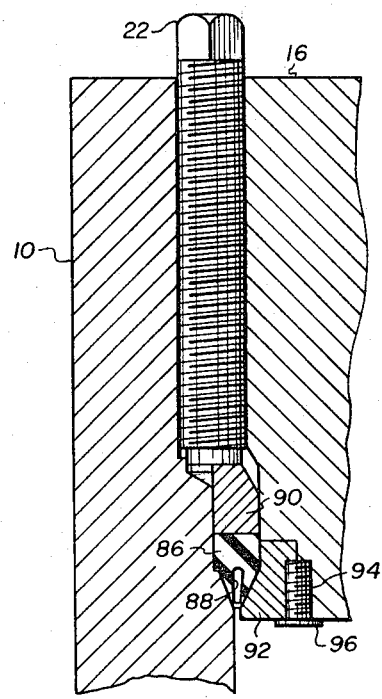

In FIGURES 10 and 11, the vessel 10 and closure plug 16 are again shown. The inner edge of the closure plug is removed and a seal ring 86 is put in its place. The purpose of removing the inner edge of the closure plug is to make possible the formation of a groove about the circumference of the closure ring and to permit installation of a ring assembly. The groove forms an annular space below the stud hole. This annular space, as shown in FIGURE 10, is offset inwardly but still in direct contact with the stud hole. Within the annular space and directly beneath the shear stud bolt is a backup ring 90. In place of the shoulder 14 as shown in FIGURE 2, the top of the backup ring serves to support the closure ring when inserted.

The upper surface of the backup ring is in direct contact with the lower end of the shear stud bolt. Directly beneath the backup ring is the seal ring 86. The upper surface of the seal ring is in direct contact with the lower surface of the backup ring. The lower end of the seal ring is tapered with a notch 88 cut into it. The lower end annular space formed by the vessel wall and a seat ring 92 are tapered together to form a receptacle for the tapered end of the seal ring. As seen by a comparison of FIGURES 10 and 11, as the shear stud bolt 22 is screwed inwardly (downwardly according to FIGURES 10 and 11) the two lips at the tapered end of the seal ring are squeezed together.

The seat ring 92 is also secured to the closure plug by a separate shear stud bolt 94 at the interface between the seat ring and the closure plug. Since the end of this shear stud is within the vessel, a seal plate 96 is welded over the shear stud to prevent leakage around the seal.

Figure 12:
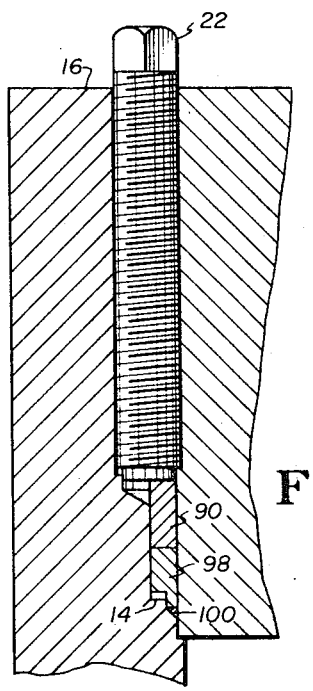

In FIGURE 12 there is illustrated another embodiment of the shear stud with a seal ring. As in FIGURE 10 and FIGURE 11 the shear stud bolt 22 and backup ring 90 are utilized. Beneath the backup ring is a jack ring 98 and beneath the jack ring is a seal ring 100 of triangular shape. In this arrangement, the shoulder 14 previously described in FIGURE 1 is used. From a point just above the shoulder 14 to the end of the shear stud hole, the outer surface of the closure plug is removed to a depth less than one-half the diameter of the shear stud. This forms an annular space for the backup ring 90 and jack ring 98. The lower end of the annular space is reduced in size and tapers towards the closure plug to form a lower annular space of triangular cross-section. In this space the triangular seal ring 100 is located. The lower end of the jack ring 98 includes a protrusion which fits into the tapered space so as to insure that the jack ring will compress the seal ring 100 when the shear stud 22 is screwed down.

FIGURE 9 shows a shear stud bolt sectioned into three parts 81, 83, and 85 aligned in tandem in interface openings 87, 89 and 91. This sectional shear stud may be used with any of the arrangements heretofore described. The sectional shear stud permits ease of insertion into the interface opening, each section requiring only one-third of the torque to get it into position. For this purpose the opening 87 may be wider at the end portion than at the next deeper drill opening portion 89 and likewise, opening portion 89 wider than opening portion 91. The pitch of the sections may also be different.

Cost estimates have shown that the shear stud closure and section joint of the invention is a fraction of the cost (and weight) of the conventional bolted flange closure and section joint for the type of vessels contemplated for its use. Forgings are kept to a minimum if not eliminated entirely, adding to the reduced cost. For conventional flanged bolted closures the cost of the shear stud closure generally accounts for one-third to one-half of the total vessel cost. To appreciate this, compare the shear stud closure with a conventional flange bolt closure for a vessel having a three foot inner diameter and designed for 7,000 p.s.i.g. internal pressure. A shear stud closed vessel of this size with a 4" thick cylinder wall, and 12.75" thick heads would weigh about 8,900 lbs. from the terminal 14.5" of the vessel from the head including the weight of the head and adjacent vessel portion. The corresponding weight of the end of a vessel with a conventional bolted flange closure is 23,700 lbs. including the weight of the head, the flange outer diameter here being 59" and the head 16.5" thick. It can readily be seen that the shear stud closure presents a considerable saving in weight. Furthermore, the flange material is all forged in the conventional bolted closure adding to the cost.

Variations may be made in the described embodiments. The interface holes and shear stud bolts between shell layers may be used with other types of closures than shown, simply as a means for holding multilayer vessels in place without the layers sliding with respect to one another. Further any number of layers may be used. The multilayer vessels may be closed with a semispherical head (similar to that of FIGURE 5) although specifically illustrated with a plug closure in FIGURE 8.

Although the invention has been described with respect to specific embodiments, many other variations may appear within the spirit and scope of the invention.

What is claimed is:

1. A vessel with a removable closure comprising:
   a shell having an opening therein;
   a closure plug having the general configuration and dimensions of said opening and being adapted to fit in said opening, said closure plug and said shell defining an interface between them, said interface having an annular groove tapered at the lower end circumferentially about the lower end of said interface and having a plurality of threaded holes therein directed from the outside of the shell and closure plug to the annular groove;
   a seal ring tapered at its lower portion located in said annular groove; and
   a plurality of threaded stud bolts screwed into said plurality of threaded holes to secure said shell and closure plug together, said seal ring being compressed at its lower portion into position within the tapered lower end of said annular groove by said plurality of threaded stud bolts.

2. A vessel as claimed in claim 1, further comprising a back-up ring directly beneath the threaded stud and above said seal ring for equally transferring the compression force of said studs onto said seal ring.

3. A vessel as claimed in claim 2, in which the lower portion of said tapered sealing ring has an annular notch therein forming two annular lips which are squeezed radially together by the tapered receptacle due to the compressed pressure of said threaded stud bolts.

References Cited

UNITED STATES PATENTS

| 2,649,988 | 8/1953 | Campbell | 220—46 |
| 2,903,152 | 9/1959 | Kuo. | |
| 3,159,302 | 12/1964 | Latham. | |

FOREIGN PATENTS 193,706   1/1938   Switzerland.

GEORGE E. LOWRANCE, *Primary Examiner.*

U.S. Cl. X.R.

220—55